United States Patent [19]
Dlugos

[11] Patent Number: 5,734,476
[45] Date of Patent: Mar. 31, 1998

[54] METHOD FOR DIMENSIONAL WEIGHING WITH OPTICS

[75] Inventor: Daniel F. Dlugos, Shelton, Conn.

[73] Assignee: Pitney Bowes Inc., Stamford, Conn.

[21] Appl. No.: 775,671

[22] Filed: Dec. 31, 1996

[51] Int. Cl.⁶ .................................................. G01B 11/28
[52] U.S. Cl. ...................... 356/380; 356/386; 356/387; 356/385; 250/560
[58] Field of Search ............................ 356/380, 386, 356/387, 385; 250/560

[56] References Cited

U.S. PATENT DOCUMENTS

| | | | |
|---|---|---|---|
| 2,803,406 | 8/1957 | Nutall et al. | 235/92 |
| 3,533,702 | 10/1970 | Hock et al. | 356/167 |
| 3,541,338 | 11/1970 | Duda et al. | 250/219 |
| 3,806,252 | 4/1974 | Harris et al. | 356/383 |
| 4,528,651 | 7/1985 | Brock et al. | 367/99 |
| 4,855,608 | 8/1989 | Peterson, II | 356/386 |
| 4,914,307 | 4/1990 | Kanev | 250/560 |
| 5,004,929 | 4/1991 | Kakinoki et al. | 250/561 |
| 5,088,827 | 2/1992 | Kyriakis | 356/372 |
| 5,102,223 | 4/1992 | Uesugi et al. | 356/376 |
| 5,175,595 | 12/1992 | Fukase | 356/387 |
| 5,214,490 | 5/1993 | Abe et al. | 356/383 |
| 5,229,597 | 7/1993 | Fukatsu | 250/208.2 |
| 5,321,273 | 6/1994 | Kamiyama et al. | 250/560 |
| 5,325,178 | 6/1994 | Louis et al. | 356/381 |
| 5,331,118 | 7/1994 | Jensen | 177/25.14 |
| 5,485,262 | 1/1996 | Tsunemiya et al. | 356/3.08 |
| 5,528,359 | 6/1996 | Taguchi | 356/327 |
| 5,534,677 | 7/1996 | Elmer et al. | 219/121.35 |

*Primary Examiner*—Frank G. Font
*Assistant Examiner*—Reginald A. Ratliff
*Attorney, Agent, or Firm*—Robert E. Meyer; Robert H. Whisker; Melvin J. Scolnick

[57] ABSTRACT

The invention is a method and apparatus for measuring the dimensions of a parcel for use in a parcel processing application of a data processing device, wherein a parcel is placed in a predetermined position on a weighing scale with a platform having at least two raised sides for placing the parcel thereagainst. When the parcel is placed, beams from a first laser source and from a second laser source are transmitted onto the parcel at a first and second target spot wherein the target spots are a known distance from each other, and wherein the target spots are in a line parallel to the weighing scale. The beams are reflected back to a rotating mirror assembly and to a beam detector. The mirror assembly is located in a line parallel to one of the two laser beam sources and is rotated at a constant rate so as to focus on the first and second target spots. The angle of focus of the mirror assembly is determinative of the distance from the mirror assembly to the parcel surface. If the determined angle of focus does not allow the mirror assembly to properly focus on the target spots, then the assembly is adjusted under control of the data processing device by adjusting the angle of focus wherein the degree of adjustment is determinative of a change in distance between the mirror assembly and the parcel surface.

10 Claims, 3 Drawing Sheets

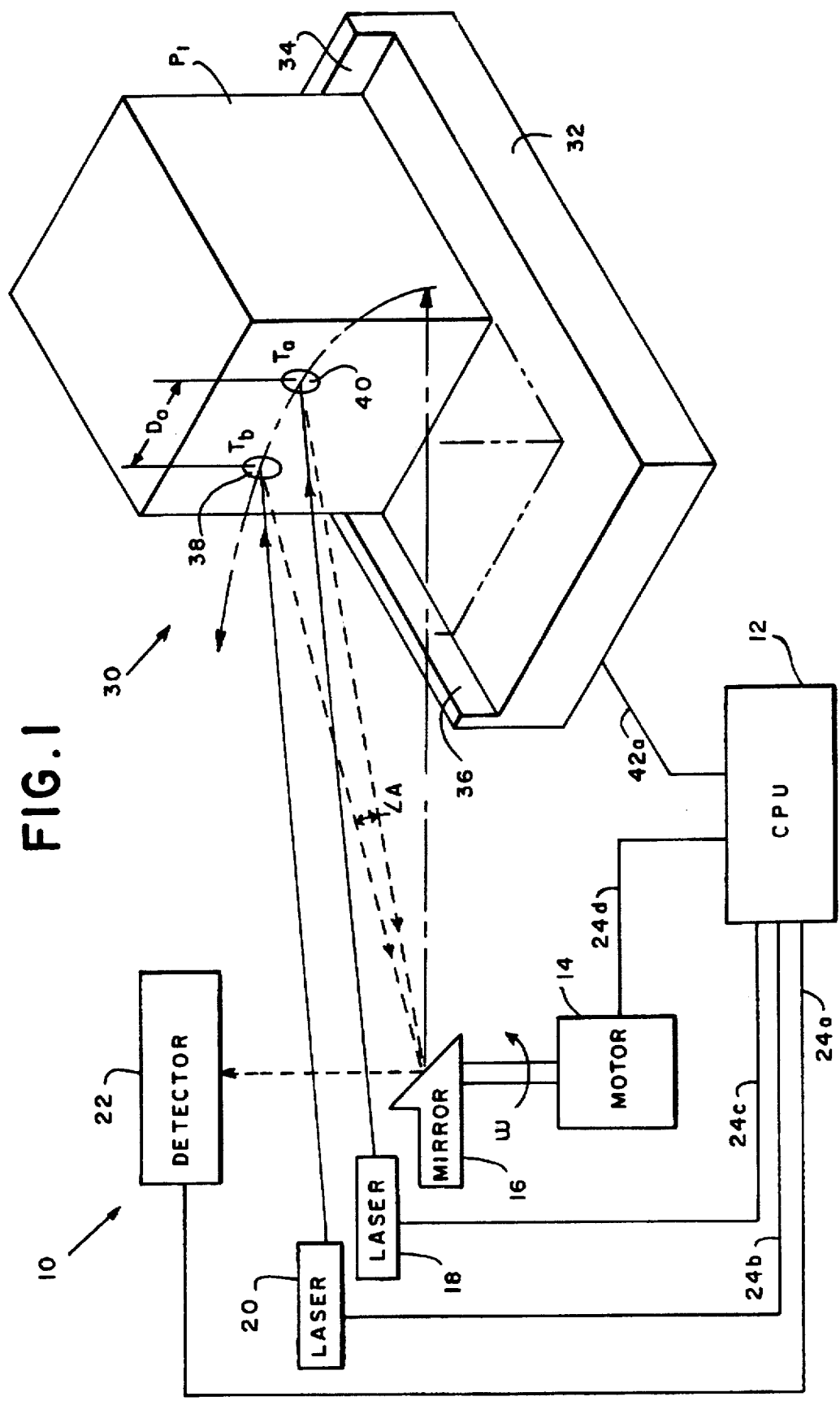

METHOD FOR DIMENSIONAL WEIGHING WITH OPTICS

RELATED APPLICATIONS

Reference is made to application Ser. No. 08/775,850 (Attorney Docket No. E-376), entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672 (Attorney Docket No. E-377), entitled METHOD FOR DIMENSIONAL WEIGHING UTILIZING POINT DETERMINATION, assigned to the assignee of this application and filed on even date herewith.

Reference is made to application Ser. No. 08/775,673 (Attorney Docket No. E-378), entitled METHOD FOR DIMENSIONAL WEIGHING UTILIZING SPACED LINE PROJECTION, assigned to the assignee of this application and filed on even date herewith.

Reference is made to application Ser. No. 08/775,549 (Attorney Docket No. E-383), entitled LOW COST DIMENSIONAL DETERMINING SYSTEM, assigned to the assignee of this application and filed on even date herewith.

Reference is made to application Ser. No. 08/775,857 (Attorney Docket No. E-384), entitled COARSE VOLUME MEASUREMENT WITH INTERLOCK, assigned to the assignee of this application and filed on even date herewith.

Reference is made to application Ser. No. 08/775,675 (Attorney Docket No. E-385), entitled AUTOMATIC DIMENSIONAL WEIGHING, assigned to the assignee of this application and filed on even date herewith.

Reference is made to application Ser. No. 08/775,550 (Attorney Docket No. E-386), entitled DIMENSIONAL WEIGHING UTILIZING A FOLLOWING ARM MECHANISM, assigned to the assignee of this application and filed on even date herewith.

Reference is made to application Ser. No. 08/775,214 (Attorney Docket No. E-387), entitled DIMENSIONAL WEIGHING UTILIZING A LINEAR DISPLACEMENT TRANSDUCER, assigned to the assignee of this application and filed on even date herewith.

Reference is made to application Ser. No. 08/775,213 (Attorney Docket No. E-422), entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674 (Attorney Docket No. E-430), entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The increased efficiencies brought by the improvements in data processing systems has helped foster increased competition among parcel and package carriers. There has been a great expansion of the services offered to shippers and in the calculation of shipping charges available to both the casual shipper and the high volume shipper. The challenge that carriers face is to develop a method of charging for carrier services that more closely reflects the reality of what shippers actually need in the way of carriage services. The development of certain efficiencies of transport and materials handling together with electronic invoicing and parcel tracking, has created an environment where carriers are now able to offer shippers mixed modes of transport, overnight delivery, better tracking of parcel movement, and discount rates in return for the utilization of labor and cost saving measures such as: bar coding; bulk delivery; pre-sorting; and, dimensional weighing.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, track, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by chutes, conveyors, rollers, or simply through human intervention with the occasional platform for weighing, measuring, or marking.

Dimensional determination is employed in various manners. U.S. Pat. No. 5,004,929 for an OPTICAL SYSTEM FOR DETECTING THREE-DIMENSIONAL SHAPE; issued Apr. 2, 1991 to Kakinoki et al. (Kakinoki) is an example of dimensional determination designed to fit a specific need. In the case of Kakinoki, for instance, laser optics is employed to detect and measure a three dimensional shape. Kakinoki is important in its use of light power to compare images of items so that quality production can be maintained over a series of measured objects. If the images match, then the quality is maintained. Dimensional determination for shipping, however, is based on comparison of each object to be measured with a pre-existing but separate measuring standard. Kakinoki, on the other hand, compares each object being detected with other objects of its type, to determine a deviation.

U.S. Pat. No. 5,331,118 for a PACKAGE DIMENSIONAL VOLUME AND WEIGHT DETERMINATION SYSTEM FOR CONVEYORS, was issued Jul. 19, 1994 to Soren Jensen (Jensen). Jensen discloses a system for determining the dimensions of a parcel moving on a conveyor belt. The parcel passes over a strip with indicia indicating units of incremental measure to determine a width, and alongside a similar strip to determine height. The length of the parcel is determined by interrupting the path of a photo-electric eye. Weight is determined by using a weigh-in-motion conveyor scale. The Jensen disclosure provides a good example of how parcel handling is enhanced through the use of simple techniques that do not require a profusion of new hardware or cause parcel movement to be inefficient.

The use of incremental measure to determine dimension has, in a general fashion, long been known in the art; but, advancements in the data processing arts have created efficiencies of measure, calculation, and application that are only recently coming into use. For instance, the use of slit light to determine the extent of curvature of surface shape is disclosed in U.S. Pat. No. 5,102,223, issued Apr. 7, 1992 to Uesugi et al. (Uesugi). Uesugi discloses a method and apparatus for projecting slit light onto a curved surface to code that surface for position, time, or light projecting angle and then comparing the resulting image with an image of a non-curved surface to create a composite which is measurable in terms of variance form a norm. While Uesugi provides an excellent means for producing measurable composites, it is not an efficient means for providing dimensional determination of parcels because of the inherent expense, in time and cost, of producing composites.

The use of sound has been employed in several ways in making dimensional determinations. Long a staple of the Naval forces in locating ships, and now commonly utilized for identifying the location of schools of fish, sound waves can be readily measured to determine the location of points relative to a starting or neutral position. An example of the use of sound in determining the linear measurement of objects is U.S. Pat. No. 4,528,651, issued on Jul. 9, 1985 to Brock et at. (Brock). Brock teaches the measurement of objects, preferably cylindrical, by passing the objects through an array of transducers that perform echo ranging to determine length and diameter. Rectangularly shaped objects or parcels would be limited to only the measurements of length and height.

The ability to continuously monitor a field to be measured is known in the art; consider U.S. Pat. No. 5,325,178 for a METHOD OF MEASURING THE DIMENSIONS OF MOVING OBJECTS, issued on Jun. 28, 1994 to Louis et al. (Louis). Louis teaches that the length, width, and height of objects on a conveyor belt can be determined by utilizing fixed position CCD cameras to measure along predefined axes. The disadvantage to Louis is that the measuring devices (i.e., the CCD cameras) are sited along fixed lines, and therefore, objects of varied dimension can not be accurately measured.

Thus, an object of the present invention is to provide a cost effective means for determining the dimensions of a parcel. The ability of the shipper to enjoy reductions in rates from carriers by implementing certain efficiencies in operation, and to do so without slowing work flow or driving up costs, is a distinct advantage to be gained by the system user.

SUMMARY OF THE INVENTION

According to the invention, the object is achieved and the disadvantages of the prior art are overcome by a method and apparatus for measuring the dimensions of a parcel for use in a parcel processing application of a data processing device.

The method of the present invention begins with the placing of a parcel in a predetermined position on a platform or supporting means (hereinafter platform) within a field of measurement. The platform is preferably the weighing surface of a weighing scale capable of determining the weight of a parcel placed thereupon. Additionally, the platform has at least two raised sides wherein two of the raised sides meet at right angles for placing the parcel thereagainst.

When the parcel is placed, a beam from a first laser source is transmitted onto a surface of the parcel at first target spot. A second beam is transmitted from a second laser source onto the parcel at a second target spot wherein the second target spot is at a known distance from the first target spot and wherein the first target spot and the second target spot are in a line parallel to the platform. The beams are reflected back to a rotating mirror assembly.

To determine the distance that the package surface is located from the mirror assembly, the mirror assembly is located in a line parallel to one of the two laser beam sources and is rotated at a constant rate wherein the mirror assembly is focused on the first and second target spots. The angle of focus of the mirror assembly is determined wherein the angle is determinative of the distance from the mirror assembly to the parcel surface. If the determined angle of focus does not allow the mirror assembly to properly focus on the first target spot and on the second target spot, then the assembly is adjusted, under control of the data processing device, by adjusting the angle of focus wherein the degree of adjustment is determinative of a change in distance between the mirror assembly and the parcel surface.

Additionally, the first beam and the second beam are reflected from the parcel surface to the mirror assembly. The beams are then reflected from the mirror assembly to a detector under control of the data processing device. In this way, the angle of focus can be monitored and adjusted as required.

Thus, the distance from the predetermined position of the parcel to the mirror assembly can be calculated by determining the length of the parcel as a function of its predetermined position, the angle of focus of the mirror assembly, and said actual length. The calculated length and weight are displayed on a display or on a monitor and are transmitted to the parcel processing application.

The apparatus of the present invention comprises the platform or weighing scale, and the first and second laser beam transmitting means for transmitting a beam against the surface of the placed parcel and onto the target points; the target points are in a line parallel to the platform or weighing scale. Additionally, a rotating mirror assembly for focusing on the target points is included, as well as a detection apparatus for detecting a change in the angle between the assembly and the first and second target points.

The detecting, measuring, and weighing systems of the present invention are all under control of a data processing device. The data processing device controls the first and second laser beam transmitters, as well as the rotation, and angle of adjustment, of the rotating mirror assembly. Signals and measurement data from the detector apparatus are processed by the data processing device as well as the transmission of the measurement data to calculator means within the data processing device to determine actual measurements of the parcel based on a pre-selected measurement scale. Once calculated, the measurements are transmitted to a display or monitor and/or to a parcel processing application resident in the data processing device.

BRIEF DESCRIPTION OF THE DRAWINGS

FIG. 1 is a diagram of the present invention showing the angles of laser beam projection and reflection.

DETAILED DESCRIPTION OF THE PREFERRED EMBODIMENTS

Figure 2A:
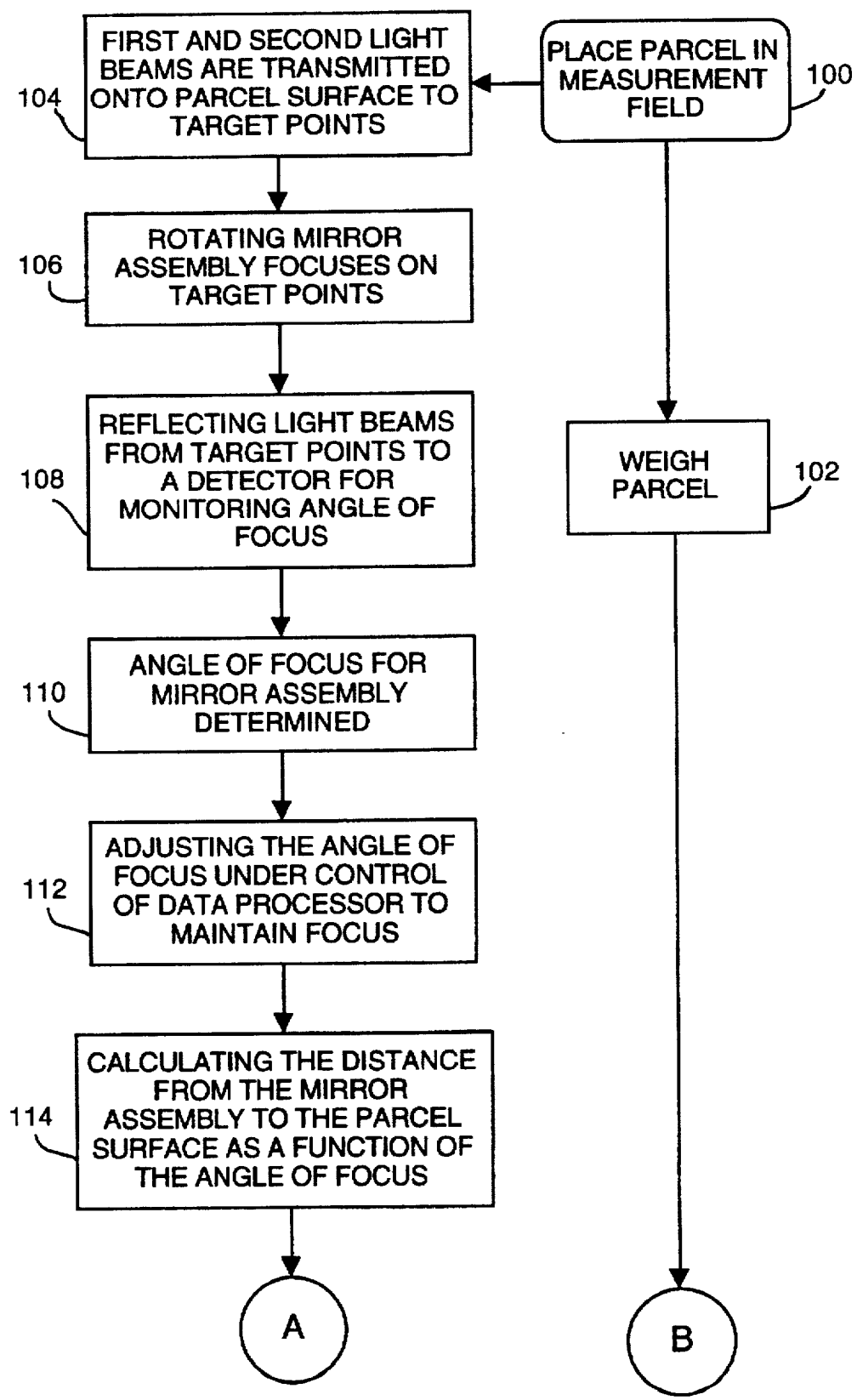
FIGS. 2A and 2B are a flowchart of the method of the present invention.

Turning to FIG. 1, there are shown two subsystems labeled subsystem 10 and subsystem 30 which taken together form the system of the present invention.

Subsystem 30 is comprised of a representative parcel $P_1$ placed upon platform 32. Platform 32 has a raised back wall 34 and a raised side wall 36 joined together at a right angle. Parcel $P_1$ is placed onto platform 32 such that one edge of parcel $P_1$ lies along raised back wall 34 and another edge of parcel $P_1$ lies along raised side wall 36. Thus, parcel $P_1$ is placed in a pre-determined position.

Platform 32 is preferably a weighing scale for determining the weight of parcels and other objects placed thereupon. Hereinafter, it will be assumed that platform 32 is a weighing scale. Platform 32 is operatively connected to a data processing device or system (hereinafter referred to as CPU 12). Platform 32 will transmit weight data to CPU 12 over interface cable 42a.

Subsystem 10 is comprised of CPU 12 which controls a number of peripheral devices utilized for determining the measurement of representative parcel $P_1$. CPU 12 is operatively connected to laser beam transmitters 18 and 20 via interface cables 24c and 24b respectively. Laser beam transmitters 18 and 20, under control of CPU 12, each transmit a beam of light onto parcel $P_1$ that will strike parcel $P_1$ at target points 38 and 40. The spacing between target points 38 and 40 is known and the target points are in a line and parallel to the top surface of platform 32. In a calculation within the formula for determining the length of parcel $P_1$, target point 38 is designated $T_b$ and target point 40 is designated $T_a$ where $T_b - T_a = T_n$. The known distance between $T_b$ and $T_a$ is designated as $D_o$.

CPU 12 controls, via interface cable 24d, motor means 14 for moving rotating mirror assembly 16. The movement of rotating mirror assembly 16 is necessary to maintain the mirror's focus on target points 38 and 40 which are a known distance apart represented. If the surface of parcel $P_1$ is forward or back relative to what the previous measurement point had been, then the mirror of rotating mirror assembly 16 will be out of focus. The angle of the mirror relative to parcel $P_1$'s surface and target points 38 and 40 will have to change in order to bring the mirror back into focus. In a calculation within the formula for determining the length of parcel $P_1$, the angle necessary to maintain focus is designated as A and the distance necessary for motor means 14 to move rotating mirror assembly 16 is designated as . The degree of change required in the focus angle can be located on a look-up table to determine the distance of the parcel surface from the mirror.

In order to monitor the focus angle that is required of rotating mirror assembly 16, detector 22 receives a reflection of the light beams from the mirror. Detector 22 is under control of CPU 12 via interface cable 24a and constantly monitors the angle of focus required by the mirror. If the data received from detector means 22 indicates to CPU 12 that the distance between rotating mirror assembly 16 and parcel $P_1$ is such that the mirror needs to be adjusted, then CPU 12 directs motor means 14, via interface cable 24d, to move rotating mirror assembly 16 to an appropriate position. The length of the movement is converted to a value by CPU 12 that is representative of the length of parcel $P_1$. Thus, there is a means for constant control of the system.

The look-up table, and applicable formulas, for conversion of the angle change relative to the parcel distance is attached hereto as an Appendix to this Specification.

Figure 2B:
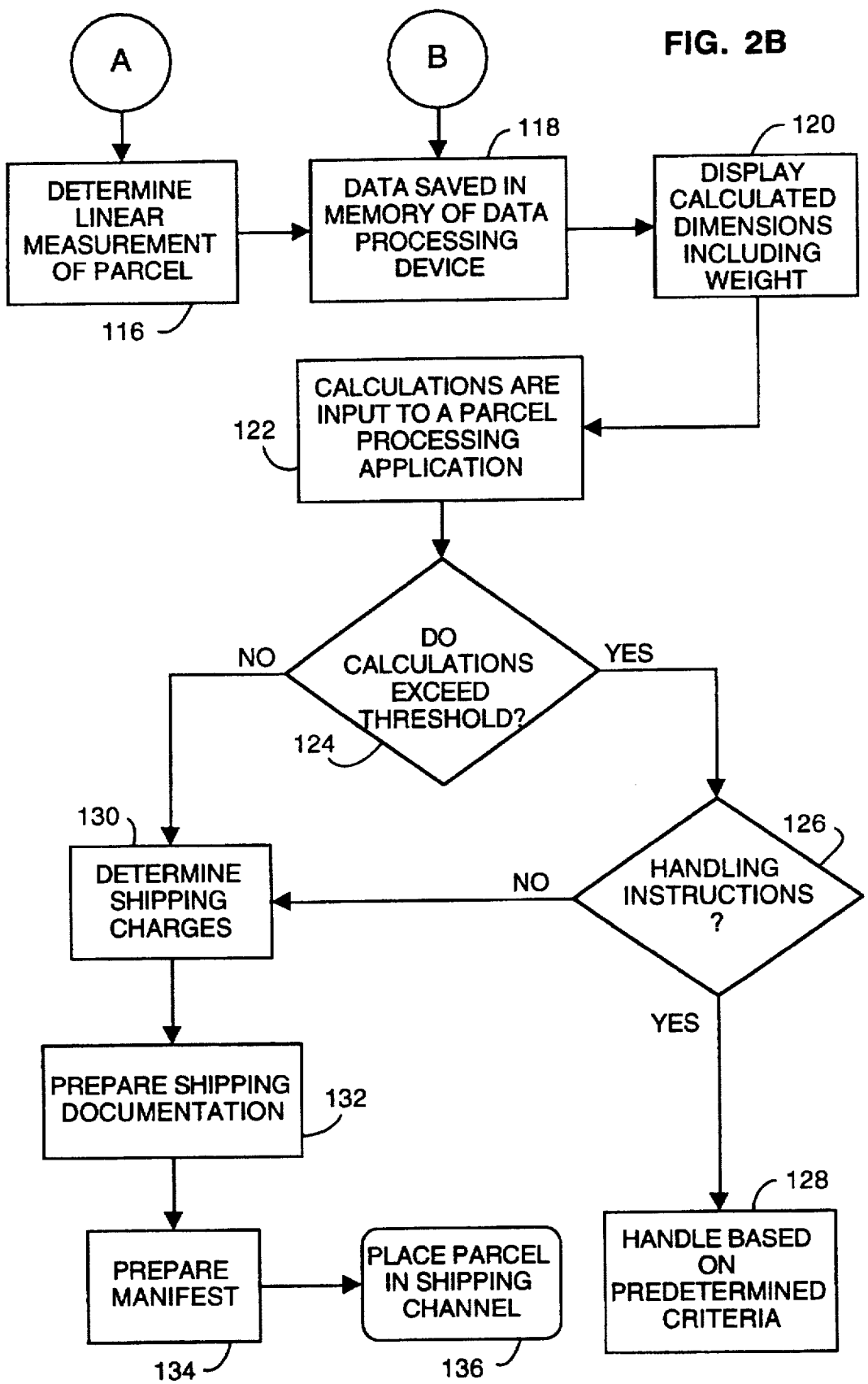

FIGS. 2A and 2B are a flowchart of the system's method. Turning to FIG. 2A, there is shown step 100 where a parcel is placed onto a weighing platform in the field of measurement and directly into contact with a raised back wall and a raised side wall of the weighing platform. From step 100, the method advances essentially simultaneously to steps 102 and 104. If the platform upon which the parcel has been placed is the surface of a weighing scale, then the weighing scale will determine the weight of the parcel at step 102 before advancing along path B to step 118, as shown in FIG. 2B, where the weight data is stored in a memory of a data processing system. If the platform upon which the parcel has been placed is not the surface of a weighing scale, then the method will not perform step 102.

As the parcel is being weighed at step 102, or if the platform is not the surface of a weighing scale, the method performs step 104 where a first beam from a first laser beam transmitter is projected onto the surface of the parcel to form a first target point; and, a second beam from a second laser beam transmitter is projected onto the surface of the parcel to form a second target point. The target points are a known distance apart and lie on a line that is parallel to the surface of the platform.

Step 104 advances to step 106 where a rotating mirror assembly, placed on a line with one of the two laser beam transmitters, focuses on the two target points at a given angle of focus. The method then advances to step 108 where the light beams projected onto the parcel surface are reflected back to the rotating mirror assembly and from the rotating mirror assembly to a detector apparatus which monitors the rotating mirror assembly's angle of focus. The monitoring data is transmitted from the detector apparatus to a data processing device which determines at step 110 whether or not the angle of focus is correct for a given parcel on the platform.

If the data processing device determines that the angle of focus is not correct, then at step 112 the data processing device directs motor means to move the rotating mirror assembly forward or backward relative to the projected target points. This movement adjusts the angle of focus so that the mirror can maintain its focus on the two target points. The method advances from step 112 to step 114.

At step 114, the data processing device, utilizing calculating means and o an appropriate look-up table, determines the distance from the rotating mirror assembly to the parcel surface as a function of the angle of focus. From step 114, the method advances along path A to step 116 as shown in FIG. 2B.

The method advances from step 116 along path A to step 116 as shown in FIG. 2B. At step 116, the length of the parcel is determined by applying the angle of focus calculation to a look-up table to determine a linear measurement relative to the known position of the parcel. Step 116 then advances to step 118 where the calculations derived from the measurement of the parcel's length and weight are stored within a memory of the data processing device for subsequent use in a parcel processing application program. From step 118, the method advances to step 120 where the stored data is distributed, under control of the CPU's application program, and the system displays the calculated dimensions and weight of the parcel to be processed. Essentially simultaneously to step 120, the calculations are input to a parcel processing application within the data processing device at step 122 which applies the data against a look-up table of values that correspond to a shipping charge as determined by a carrier's dimensional weighing guidelines.

From step 122, the method advances to a query at step 126 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 124 is "YES," then the method advances to a query at step 126 which asks if there are special handling instructions associated with a parcel corresponding to the measurements of the subject parcel. If the response to the query is "NO," then the method advances to step 130. If the response to the query at step 126 is "YES,"

however, then the method advances directly to step 128 where the parcel is further handled according to predetermined criteria which may include: rejection of the parcel by the carrier; alternate means of carriage; application of a different table of values for determining carriage charges; or, application of a service charge.

Returning to step 124, if the response to the query at step 124 is "NO," however, then the method advances to step 130 where shipping charges are determined in respect of the parcel's dimensions and any other criteria established within the application program's data table values. From step 130, the method advances to step 132 where the system prepares shipping documentation which might comprise: shipping labels; waybills; and appropriate barcoding. The method then prepares a carrier manifest, at step 134, indicative of parcels prepared for shipping. The method then advances to step 136 where the parcel is placed into its proper shipping channel.

As can be appreciated by those skilled in the art, a number of variations of the subject invention are possible. These variations include, but are not limited to: the desired distance between the target points; the capabilities of the parcel processing application; the extent to which the platform is pre-calibrated; the use of varied emitter and scanner arrays; the supporting means for supporting the laser beam sources, the rotating mirror assembly, and the detector means; and, the use of conveyors of varied ability to propel the parcel into the field of measurement. If a conveyor is used to move parcels through the field of measurement, then the capabilities of the weighing platform will necessarily be altered to accommodate weigh in motion requirements.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

APPENDIX TO DETAILED DESCRIPTION-
TABLE DATA

Please see attached.

Dimensional Weighing
(Revolutions per sec)  RPS = 10  = 2*PI*10 Radians per sec $D_o = 4$ G2=1,000,000/(2*PI*10)=  15915.49431  microsec./radian

| Assume $D_n$ | For $D_n$ ANGLE A is (Radians) | Angle A (Degrees) | DELTA Angle A for .25 inch Dn | DELTA DEGREES | DELTA MINUTES | DELTA MICROSEC | ANGLE A (microsec) = Angle A (radians) times G2(microsec/radian) | $D_n$ = Distance = $D_o$ times Cotangent of Angle A (microsec) | delta Tn % |
|---|---|---|---|---|---|---|---|---|---|
| 10.00 | 0.38051 | 21.80141 | 0.380506 | 21.8014 | 1308.085 |  | 6055.947080 | 10.00 | 0.00 |
| 10.25 | 0.37207 | 21.31791 | −0.008439 | −0.4835 | −29.010 | −134.305 | 5921.642299 | 10.25 | −2.27 |
| 10.50 | 0.36398 | 20.85446 | −0.008089 | −0.4635 | −27.807 | −128.737 | 5792.905011 | 10.50 | −2.22 |
| 10.75 | 0.35622 | 20.40988 | −0.007759 | −0.4446 | −26.675 | −123.493 | 5669.411898 | 10.75 | −2.18 |
| 11.00 | 0.34877 | 19.98311 | −0.007449 | −0.4268 | −25.607 | −118.549 | 5550.862923 | 11.00 | −2.14 |
| 11.25 | 0.34162 | 19.57313 | −0.007156 | −0.4100 | −24.599 | −113.884 | 5436.979397 | 11.25 | −2.09 |
| 11.50 | 0.33474 | 19.17901 | −0.006879 | −0.3941 | −23.647 | −109.477 | 5327.502229 | 11.50 | −2.05 |
| 11.75 | 0.32812 | 18.79989 | −0.006617 | −0.3791 | −22.747 | −105.312 | 5222.190322 | 11.75 | −2.02 |
| 12.00 | 0.32175 | 18.43495 | −0.006369 | −0.3649 | −21.896 | −101.371 | 5120.819117 | 12.00 | −1.98 |
| 12.25 | 0.31562 | 18.08345 | −0.006135 | −0.3515 | −21.090 | −97.640 | 5023.179273 | 12.25 | −1.94 |
| 12.50 | 0.30970 | 17.74467 | −0.005913 | −0.3388 | −20.326 | −94.104 | 4929.075451 | 12.50 | −1.91 |
| 12.75 | 0.30400 | 17.41797 | −0.005702 | −0.3267 | −19.602 | −90.750 | 4838.325220 | 12.75 | −1.88 |
| 13.00 | 0.29850 | 17.10273 | −0.005502 | −0.3152 | −18.915 | −87.567 | 4750.758047 | 13.00 | −1.84 |
| 13.25 | 0.29319 | 16.79837 | −0.005312 | −0.3044 | −18.261 | −84.544 | 4666.214384 | 13.25 | −1.81 |
| 13.50 | 0.28806 | 16.50436 | −0.005131 | −0.2940 | −17.641 | −81.670 | 4584.544828 | 13.50 | −1.78 |
| 13.75 | 0.28310 | 16.22019 | −0.004960 | −0.2842 | −17.050 | −78.935 | 4505.609360 | 13.75 | −1.75 |
| 14.00 | 0.27830 | 15.94540 | −0.004796 | −0.2748 | −16.488 | −76.333 | 4429.276639 | 14.00 | −1.72 |
| 14.25 | 0.27366 | 15.67952 | −0.004640 | −0.2659 | −15.952 | −73.853 | 4355.423367 | 14.25 | −1.70 |
| 14.50 | 0.26917 | 15.42216 | −0.004492 | −0.2574 | −15.442 | −71.490 | 4283.933700 | 14.50 | −1.67 |
| 14.75 | 0.26482 | 15.17292 | −0.004350 | −0.2492 | −14.955 | −69.235 | 4214.698707 | 14.75 | −1.64 |
| 15.00 | 0.26060 | 14.93142 | −0.004215 | −0.2415 | −14.490 | −67.083 | 4147.615883 | 15.00 | −1.62 |
| 15.25 | 0.25652 | 14.69732 | −0.004086 | −0.2341 | −14.046 | −65.027 | 4082.588689 | 15.25 | −1.59 |
| 15.50 | 0.25255 | 14.47029 | −0.003962 | −0.2270 | −13.622 | −63.063 | 4019.526139 | 15.50 | −1.57 |
| 15.75 | 0.24871 | 14.25003 | −0.003844 | −0.2203 | −13.216 | −61.184 | 3958.342416 | 15.75 | −1.55 |
| 16.00 | 0.24498 | 14.03624 | −0.003731 | −0.2138 | −12.827 | −59.386 | 3898.956519 | 16.00 | −1.52 |
| 16.25 | 0.24136 | 13.82865 | −0.003623 | −0.2076 | −12.456 | −57.665 | 3841.291937 | 16.25 | −1.50 |
| 16.50 | 0.23784 | 13.62699 | −0.003520 | −0.2017 | −12.099 | −56.016 | 3785.276350 | 16.50 | −1.48 |
| 16.75 | 0.23442 | 13.43103 | −0.003420 | −0.1960 | −11.758 | −54.435 | 3730.841353 | 16.75 | −1.46 |
| 17.00 | 0.23109 | 13.24052 | −0.003325 | −0.1905 | −11.431 | −52.919 | 3677.922199 | 17.00 | −1.44 |
| 17.25 | 0.22786 | 13.05525 | −0.003234 | −0.1853 | −11.116 | −51.465 | 3626.457562 | 17.25 | −1.42 |
| 17.50 | 0.22471 | 12.87500 | −0.003146 | −0.1802 | −10.815 | −50.068 | 3576.389322 | 17.50 | −1.40 |
| 17.75 | 0.22165 | 12.69958 | −0.003062 | −0.1754 | −10.525 | −48.727 | 3527.662358 | 17.75 | −1.38 |
| 18.00 | 0.21867 | 12.52881 | −0.002981 | −0.1708 | −10.247 | −47.438 | 3480.224364 | 18.00 | −1.36 |
| 18.25 | 0.21577 | 12.36249 | −0.002903 | −0.1663 | −9.979 | −46.199 | 3434.025671 | 18.25 | −1.35 |
| 18.50 | 0.21294 | 12.20047 | −0.002828 | −0.1620 | −9.721 | −45.007 | 3389.019091 | 18.50 | −1.33 |
| 18.75 | 0.21018 | 12.04258 | −0.002756 | −0.1579 | −9.474 | −43.859 | 3345.159762 | 18.75 | −1.31 |
| 19.00 | 0.20750 | 11.88866 | −0.002686 | −0.1539 | −9.235 | −42.755 | 3302.405011 | 19.00 | −1.29 |
| 19.25 | 0.20488 | 11.73857 | −0.002620 | −0.1501 | −9.005 | −41.691 | 3260.714224 | 19.25 | −1.28 |

-continued

Dimensional Weighing
(Revolutions per sec)   RPS = 10 = 2*PI*10 Radians per sec $D_o = 4$ $G2 = 1,000,000/(2*PI*10) = 15915.49431$ microsec./radian

| Assume $D_n$ | For $D_n$ ANGLE A is (Radians) | Angle A (Degrees) | DELTA Angle A for .25 inch Dn | DELTA DEGREES | DELTA MINUTES | DELTA MICROSEC | ANGLE A (microsec) = Angle A (radians) times G2(microsec/radian) | $D_n$ = Distance = $D_o$ times Cotangent of Angle A (microsec) | delta Tn % |
|---|---|---|---|---|---|---|---|---|---|
| 19.50 | 0.20232 | 11.59218 | −0.002555 | −0.1464 | −8.784 | −40.665 | 3220.048725 | 19.50 | −1.26 |
| 19.75 | 0.19983 | 11.44934 | −0.002493 | −0.1428 | −8.570 | −39.677 | 3180.371663 | 19.75 | −1.25 |
| 20.00 | 0.19740 | 11.30993 | −0.002433 | −0.1394 | −8.364 | −38.724 | 3141.647909 | 20.00 | −1.23 |
| 20.25 | 0.19502 | 11.17384 | −0.002375 | −0.1361 | −8.166 | −37.804 | 3103.843956 | 20.25 | −1.22 |
| 20.50 | 0.19270 | 11.04094 | −0.002320 | −0.1329 | −7.974 | −36.916 | 3066.927828 | 20.50 | −1.20 |
| 20.75 | 0.19044 | 10.91113 | −0.002266 | −0.1298 | −7.789 | −36.059 | 3030.868996 | 20.75 | −1.19 |
| 21.00 | 0.18822 | 10.78430 | −0.002214 | −0.1268 | −7.610 | −35.231 | 2995.638297 | 21.00 | −1.18 |
| 21.25 | 0.18606 | 10.66035 | −0.002163 | −0.1239 | −7.437 | −34.430 | 2961.207860 | 21.25 | −1.16 |
| 21.50 | 0.18394 | 10.53918 | −0.002115 | −0.1212 | −7.270 | −33.657 | 2927.551036 | 21.50 | −1.15 |
| 21.75 | 0.18188 | 10.42071 | −0.002068 | −0.1185 | −7.108 | −32.909 | 2894.642332 | 21.75 | −1.14 |
| 22.00 | 0.17985 | 10.30485 | −0.002022 | −0.1159 | −6.952 | −32.185 | 2862.457352 | 22.00 | −1.12 |
| 22.25 | 0.17788 | 10.19150 | −0.001978 | −0.1133 | −6.801 | −31.485 | 2830.972736 | 22.25 | −1.11 |
| 22.50 | 0.17594 | 10.08060 | −0.001936 | −0.1109 | −6.654 | −30.807 | 2800.166108 | 22.50 | −1.10 |
| 22.75 | 0.17405 | 9.97206 | −0.001894 | −0.1085 | −6.512 | −30.150 | 2770.016024 | 22.75 | −1.09 |
| 23.00 | 0.17219 | 9.86581 | −0.001054 | −0.1063 | −3.375 | −29.514 | 2740.501929 | 23.00 | −1.08 |
| 23.25 | 0.17038 | 9.76177 | −0.001816 | −0.1040 | −6.242 | −28.898 | 2711.604104 | 23.25 | −1.07 |
| 23.50 | 0.16860 | 9.65989 | −0.001778 | −0.1019 | −6.113 | −28.300 | 2683.303633 | 23.50 | −1.05 |
| 23.75 | 0.16686 | 9.56010 | −0.001742 | −0.0998 | −5.988 | −27.721 | 2655.582356 | 23.75 | −1.04 |
| 24.00 | 0.16515 | 9.46232 | −0.001706 | −0.0978 | −5.866 | −27.160 | 2628.422836 | 24.00 | −1.03 |
| 24.25 | 0.16348 | 9.36651 | −0.001672 | −0.0958 | −5.749 | −26.615 | 2601.808321 | 24.25 | −1.02 |
| 24.50 | 0.16184 | 9.27260 | −0.001639 | −0.0939 | −5.634 | −26.086 | 2575.722716 | 24.50 | −1.01 |
| 24.75 | 0.16023 | 9.18054 | −0.001607 | −0.0921 | −5.524 | −25.572 | 2550.150544 | 24.75 | −1.00 |
| 25.00 | 0.15866 | 9.09028 | −0.001575 | −0.0903 | −5.416 | −25.074 | 2525.076922 | 25.00 | −0.99 |
| 25.25 | 0.15711 | 9.00176 | −0.001545 | −0.0885 | −5.311 | −24.589 | 2500.487534 | 25.25 | −0.98 |
| 25.50 | 0.15559 | 8.91493 | −0.001515 | −0.0868 | −5.210 | −24.119 | 2476.368599 | 25.50 | −0.97 |
| 25.75 | 0.15411 | 8.82974 | −0.001487 | −0.0852 | −5.111 | −23.662 | 2452.706852 | 25.75 | −0.96 |
| 26.00 | 0.15265 | 8.74616 | −0.001459 | −0.0836 | −5.015 | −23.217 | 2429.489517 | 26.00 | −0.96 |
| 26.25 | 0.15122 | 8.66414 | −0.001432 | −0.0820 | −4.922 | −22.785 | 2406.704287 | 26.25 | −0.95 |
| 26.50 | 0.14981 | 8.58362 | −0.001405 | −0.0805 | −4.831 | −22.365 | 2384.339300 | 26.50 | −0.94 |
| 26.75 | 0.14843 | 8.50458 | −0.001380 | −0.0790 | −4.743 | −21.956 | 2362.383122 | 26.75 | −0.93 |
| 27.00 | 0.14708 | 8.42697 | −0.001355 | −0.0776 | −4.657 | −21.558 | 2340.824728 | 27.00 | −0.92 |
| 27.25 | 0.14575 | 8.35075 | −0.001330 | −0.0762 | −4.573 | −21.171 | 2319.653481 | 27.25 | −0.91 |
| 27.50 | 0.14444 | 8.27589 | −0.001307 | −0.0749 | −4.492 | −20.794 | 2298.859119 | 27.50 | −0.90 |
| 27.75 | 0.14316 | 8.20235 | −0.001283 | −0.0735 | −4.412 | −20.427 | 2278.431735 | 27.75 | −0.90 |
| 28.00 | 0.14190 | 8.13010 | −0.001261 | −0.0723 | −4.335 | −20.070 | 2258.361765 | 28.00 | −0.89 |
| 28.25 | 0.14066 | 8.05910 | −0.001239 | −0.0710 | −4.260 | −19.722 | 2238.639973 | 28.25 | −0.88 |
| 28.50 | 0.13944 | 7.98933 | −0.001218 | −0.0698 | −4.187 | −19.383 | 2219.257435 | 28.50 | −0.87 |
| 28.75 | 0.13824 | 7.92074 | −0.001197 | −0.0686 | −4.115 | −19.052 | 2200.205528 | 28.75 | −0.87 |
| 29.00 | 0.13707 | 7.85331 | −0.001177 | −0.0674 | −4.046 | −18.730 | 2181.475917 | 29.00 | −0.86 |
| 29.25 | 0.13591 | 7.78702 | −0.001157 | −0.0663 | −3.978 | −18.415 | 2163.060543 | 29.25 | −0.85 |
| 29.50 | 0.13477 | 7.72183 | −0.001138 | −0.0652 | −3.912 | −18.109 | 2144.951611 | 29.50 | −0.84 |
| 29.75 | 0.13365 | 7.65771 | −0.001119 | −0.0641 | −3.847 | −17.810 | 2127.141582 | 29.75 | −0.84 |
| 30.00 | 0.13255 | 7.59464 | −0.001101 | −0.0631 | −3.784 | −17.518 | 2109.623158 | 30.00 | −0.83 |
| 30.25 | 0.13147 | 7.53260 | −0.001083 | −0.0620 | −3.723 | −17.234 | 2092.389278 | 30.25 | −0.82 |
| 30.50 | 0.13040 | 7.47156 | −0.001065 | −0.0610 | −3.663 | −16.956 | 2075.433105 | 30.50 | −0.82 |
| 30.75 | 0.12935 | 7.41149 | −0.001048 | −0.0601 | −3.604 | −16.685 | 2058.748016 | 30.75 | −0.81 |
| 31.00 | 0.12832 | 7.35238 | −0.001032 | −0.0591 | −3.547 | −16.420 | 2042.327600 | 31.00 | −0.80 |
| 31.25 | 0.12731 | 7.29420 | −0.001015 | −0.0582 | −3.491 | −16.162 | 2026.165641 | 31.25 | −0.80 |
| 31.50 | 0.12631 | 7.23692 | −0.001000 | −0.0573 | −3.436 | −15.910 | 2010.256118 | 31.50 | −0.79 |
| 31.75 | 0.12532 | 7.18054 | −0.000984 | −0.0564 | −3.383 | −15.663 | 1994.593194 | 31.75 | −0.79 |
| 32.00 | 0.12435 | 7.12502 | −0.000969 | −0.0555 | −3.331 | −15.422 | 1979.171208 | 32.00 | −0.78 |
| 32.25 | 0.12340 | 7.07034 | −0.000954 | −0.0547 | −3.280 | −15.187 | 1963.984672 | 32.25 | −0.77 |
| 32.50 | 0.12246 | 7.01650 | −0.000940 | −0.0538 | −3.231 | −14.956 | 1949.028262 | 32.50 | −0.77 |
| 32.75 | 0.12154 | 6.96347 | −0.000926 | −0.0530 | −3.182 | −14.731 | 1934.296813 | 32.75 | −0.76 |
| 33.00 | 0.12062 | 6.91123 | −0.000912 | −0.0522 | −3.134 | −14.512 | 1919.785311 | 33.00 | −0.76 |
| 33.25 | 0.11973 | 6.85976 | −0.000898 | −0.0515 | −3.088 | −14.296 | 1905.488890 | 33.25 | −0.75 |
| 33.50 | 0.11884 | 6.80905 | −0.000885 | −0.0507 | −3.043 | −14.086 | 1891.402828 | 33.50 | −0.74 |
| 33.75 | 0.11797 | 6.75908 | −0.000872 | −0.0500 | −2.998 | −13.880 | 1877.522535 | 33.75 | −0.74 |
| 34.00 | 0.11711 | 6.70984 | −0.000859 | −0.0492 | −2.955 | −13.679 | 1863.843558 | 34.00 | −0.73 |
| 34.25 | 0.11626 | 6.66130 | −0.000847 | −0.0485 | −2.912 | −13.482 | 1850.361567 | 34.25 | −0.73 |
| 34.50 | 0.11543 | 6.61346 | −0.000835 | −0.0478 | −2.870 | −13.289 | 1837.072356 | 34.50 | −0.72 |
| 34.75 | 0.11460 | 6.56630 | −0.000823 | −0.0472 | −2.830 | −13.101 | 1823.971839 | 34.75 | −0.72 |
| 35.00 | 0.11379 | 6.51980 | −0.000812 | −0.0465 | −2.790 | −12.916 | 1811.056042 | 35.00 | −0.71 |
| 35.25 | 0.11299 | 6.47396 | −0.000800 | −0.0458 | −2.751 | −12.735 | 1798.321102 | 35.25 | −0.71 |
| 35.50 | 0.11220 | 6.42875 | −0.000789 | −0.0452 | −2.712 | −12.558 | 1785.763264 | 35.50 | −0.70 |
| 35.75 | 0.11142 | 6.38416 | −0.000778 | −0.0446 | −2.675 | −12.384 | 1773.378872 | 35.75 | −0.70 |
| 36.00 | 0.11066 | 6.34019 | −0.000767 | −0.0440 | −2.638 | −12.214 | 1761.164374 | 36.00 | −0.69 |
| 36.25 | 0.10990 | 6.29682 | −0.000757 | −0.0434 | −2.602 | −12.048 | 1749.116311 | 36.25 | −0.69 |

Dimensional Weighing
(Revolutions per sec)    RPS = 10 = 2*PI*10 Radians per sec $D_o = 4$ G2=1,000,000/(2*PI*10)= 15915.49431 microsec./radian

| Assume $D_n$ | For $D_n$ ANGLE A is (Radians) | Angle A (Degrees) | DELTA Angle A for .25 inch Dn | DELTA DEGREES | DELTA MINUTES | DELTA MICROSEC | ANGLE A (microsec) = Angle A (radians) times G2(microsec/radian) | $D_n$ = Distance = $D_o$ times Cotangent of Angle A (microsec) | delta Tn % |
|---|---|---|---|---|---|---|---|---|---|
| 36.50 | 0.10915 | 6.25403 | −0.000747 | −0.0428 | −2.567 | −11.885 | 1737.231318 | 36.50 | −0.68 |
| 36.75 | 0.10842 | 6.21182 | −0.000737 | −0.0422 | −2.533 | −11.725 | 1725.506119 | 36.75 | −0.68 |
| 37.00 | 0.10769 | 6.17018 | −0.000727 | −0.0416 | −2.499 | −11.569 | 1713.937526 | 37.00 | −0.67 |
| 37.25 | 0.10697 | 6.12908 | −0.000717 | −0.0411 | −2.466 | −11.415 | 1702.522435 | 37.25 | −0.67 |
| 37.50 | 0.10626 | 6.08853 | −0.000708 | −0.0406 | −2.433 | −11.265 | 1691.257821 | 37.50 | −0.67 |
| 37.75 | 0.10557 | 6.04851 | −0.000699 | −0.0400 | −2.401 | −11.117 | 1680.140739 | 37.75 | −0.66 |
| 38.00 | 0.10488 | 6.00901 | −0.000689 | −0.0395 | −2.370 | −10.972 | 1669.168322 | 38.00 | −0.66 |
| 38.25 | 0.10420 | 5.97002 | −0.000681 | −0.0390 | −2.339 | −10.831 | 1658.337772 | 38.25 | −0.65 |
| 38.50 | 0.10352 | 5.93153 | −0.000672 | −0.0385 | −2.309 | −10.691 | 1647.646368 | 38.50 | −0.65 |
| 38.75 | 0.10286 | 5.89353 | −0.000663 | −0.0380 | −2.280 | −10.555 | 1637.091453 | 38.75 | −0.64 |
| 39.00 | 0.10221 | 5.85601 | −0.000655 | −0.0375 | −2.251 | −10.421 | 1626.670440 | 39.00 | −0.64 |
| 39.25 | 0.10156 | 5.81897 | −0.000647 | −0.0370 | −2.223 | −10.290 | 1616.380806 | 39.25 | −0.64 |
| 39.50 | 0.10092 | 5.78239 | −0.000638 | −0.0366 | −2.195 | −10.161 | 1606.220090 | 39.50 | −0.63 |
| 39.75 | 0.10029 | 5.74627 | −0.000630 | −0.0361 | −2.167 | −10.034 | 1596.185892 | 39.75 | −0.63 |
| 40.00 | 0.09967 | 5.71059 | −0.000023 | −0.0357 | −2.141 | −9.910 | 1586.275872 | 40.00 | −0.62 |
| 40.25 | 0.09905 | 5.67536 | −0.000615 | −0.0352 | −2.114 | −9.788 | 1576.487746 | 40.25 | −0.62 |
| 40.50 | 0.09845 | 5.64055 | −0.000607 | −0.0348 | −2.088 | −9.668 | 1566.819287 | 40.50 | −0.62 |
| 40.75 | 0.09785 | 5.60617 | −0.000600 | −0.0344 | −2.063 | −9.551 | 1557.268320 | 40.75 | −0.61 |
| 41.00 | 0.09725 | 5.57220 | −0.000593 | −0.0340 | −2.038 | −9.436 | 1547.832723 | 41.00 | −0.61 |
| 41.25 | 0.09667 | 5.53864 | −0.000586 | −0.0336 | −2.014 | −9.322 | 1538.510426 | 41.25 | −0.61 |
| 41.50 | 0.09609 | 5.50548 | −0.000579 | −0.0332 | −1.990 | −9.211 | 1529.299405 | 41.50 | −0.60 |
| 41.75 | 0.09552 | 5.47271 | −0.000572 | −0.0328 | −1.966 | −9.102 | 1520.197686 | 41.75 | −0.60 |
| 42.00 | 0.09495 | 5.44033 | −0.000565 | −0.0324 | −1.943 | −8.994 | 1511.203342 | 42.00 | −0.60 |
| 42.25 | 0.09439 | 5.40833 | −0.000559 | −0.0320 | −1.920 | −8.889 | 1502.314488 | 42.25 | −0.59 |
| 42.50 | 0.09384 | 5.37671 | −0.000552 | −0.0316 | −1.898 | −8.785 | 1493.529286 | 42.50 | −0.59 |
| 42.75 | 0.09330 | 5.34545 | −0.000546 | −0.0313 | −1.876 | −8.683 | 1484.845937 | 42.75 | −0.58 |
| 43.00 | 0.09276 | 5.31455 | −0.000539 | −0.0309 | −1.854 | −8.583 | 1476.262686 | 43.00 | −0.58 |
| 43.25 | 0.09222 | 5.28400 | −0.000533 | −0.0305 | −1.833 | −8.485 | 1467.777817 | 43.25 | −0.58 |
| 43.50 | 0.09170 | 5.25380 | −0.000527 | −0.0302 | −1.812 | −8.388 | 1459.389653 | 43.50 | −0.57 |
| 43.75 | 0.09118 | 5.22395 | −0.000521 | −0.0299 | −1.791 | −8.293 | 1451.096555 | 43.75 | −0.57 |
| 44.00 | 0.09066 | 5.19443 | −0.000515 | −0.0295 | −1.771 | −8.200 | 1442.896919 | 44.00 | −0.57 |
| 44.25 | 0.09015 | 5.16524 | −0.000509 | −0.0292 | −1.751 | −8.108 | 1434.789179 | 44.25 | −0.57 |
| 44.50 | 0.08965 | 5.13638 | −0.000504 | −0.0289 | −1.732 | −8.017 | 1426.771803 | 44.50 | −0.56 |
| 44.75 | 0.08915 | 5.10784 | −0.000498 | −0.0285 | −1.713 | −7.929 | 1418.843293 | 44.75 | −0.56 |
| 45.00 | 0.08866 | 5.07961 | −0.000493 | −0.0282 | −1.694 | −7.841 | 1411.002183 | 45.00 | −0.56 |
| 45.25 | 0.08817 | 5.05159 | −0.000487 | −0.0279 | −1.675 | −7.755 | 1403.247040 | 45.25 | −0.55 |
| 45.50 | 0.08769 | 5.02408 | −0.000482 | −0.0276 | −1.657 | −7.671 | 1395.576461 | 45.50 | −0.55 |
| 45.75 | 0.08721 | 4.99676 | −0.000477 | −0.0273 | −1.639 | −7.587 | 1387.989073 | 45.75 | −0.55 |
| 46.00 | 0.08674 | 4.96974 | −0.000472 | −0.0270 | −1.621 | −7.506 | 1380.483536 | 46.00 | −0.54 |
| 46.25 | 0.08627 | 4.94301 | −0.000467 | −0.0267 | −1.604 | −7.425 | 1373.058533 | 46.25 | −0.54 |
| 46.50 | 0.08581 | 4.91657 | −0.000462 | −0.0264 | −1.587 | −7.346 | 1365.712779 | 46.50 | −0.54 |
| 46.75 | 0.08535 | 4.89040 | −0.000457 | −0.0262 | −1.570 | −7.268 | 1358.445016 | 46.75 | −0.54 |
| 47.00 | 0.08490 | 4.86451 | −0.000452 | −0.0259 | −1.553 | −7.191 | 1351.254010 | 47.00 | −0.53 |
| 47.25 | 0.08445 | 4.83890 | −0.000447 | −0.0256 | −1.537 | −7.115 | 1344.138556 | 47.25 | −0.53 |
| 47.50 | 0.08401 | 4.81355 | −0.000442 | −0.0253 | −1.521 | −7.041 | 1337.097470 | 47.50 | −0.53 |
| 47.75 | 0.08357 | 4.78847 | −0.000438 | −0.0251 | −1.505 | −6.968 | 1330.129597 | 47.75 | −0.52 |
| 48.00 | 0.08314 | 4.76364 | −0.000433 | −0.0248 | −1.489 | −6.896 | 1323.233803 | 48.00 | −0.52 |
| 48.25 | 0.08271 | 4.73907 | −0.000429 | −0.0246 | −1.474 | −6.825 | 1316.408977 | 48.25 | −0.52 |
| 48.50 | 0.08229 | 4.71475 | −0.000424 | −0.0243 | −1.459 | −6.755 | 1309.654033 | 48.50 | −0.52 |
| 48.75 | 0.08187 | 4.69068 | −0.000420 | −0.0241 | −1.444 | −6.686 | 1302.967904 | 48.75 | −0.51 |
| 49.00 | 0.08145 | 4.66686 | −0.000416 | −0.0238 | −1.430 | −6.618 | 1296.349548 | 49.00 | −0.51 |
| 49.25 | 0.08104 | 4.64327 | −0.000412 | −0.0236 | −1.415 | −6.552 | 1289.797940 | 49.25 | −0.51 |
| 49.50 | 0.08063 | 4.61992 | −0.000408 | −0.0233 | −1.401 | −6.486 | 1283.312078 | 49.50 | −0.51 |
| 49.75 | 0.08023 | 4.59681 | −0.000403 | −0.0231 | −1.387 | −6.421 | 1276.890980 | 49.75 | −0.50 |
| 50.00 | 0.07983 | 4.57392 | −0.000399 | −0.0229 | −1.373 | −6.357 | 1270.533683 | 50.00 | −0.50 |

What is claimed is:

1. A method for measuring the dimensions of a parcel for use in a parcel processing application of a data processing device and comprising the steps of:

(a) placing a parcel in a predetermined position on a platform within a field of measurement;

(b) transmitting a first beam from a first laser source onto a surface of said parcel at first target spot;

(c) transmitting a second beam from a second laser source onto said parcel at a second target spot wherein said second target spot is a known distance from said first target spot and wherein said first target spot and said second target spot are in a line parallel to said platform;

(d) rotating a mirror assembly at a constant rate wherein said mirror assembly is focused on said first target spot and said second target spot;

(e) determining an angle of focus of said mirror assembly wherein said angle is determinative of a distance from said mirror assembly to said parcel surface;

(f) adjusting said angle of focus if said determined angle of focus does not allow said mirror assembly to focus on said first target spot and said second target spot, wherein the degree of adjustment is determinative of a change in distance between said mirror assembly and said parcel surface;

(f) reflecting said first beam and said second beam from said parcel surface to said mirror assembly;

(g) reflecting said first beam and said second beam from said mirror assembly to a detector under control of said data processing device;

(h) measuring a distance from said predetermined position of said parcel to said mirror assembly; and (i) determining a length of said parcel as a function of said predetermined position, said angle of focus, and said length.

2. The method of claim 1, wherein said platform is the weighing surface of a scale capable of calculating a weight of said placed parcel.

3. The method of claim 1, wherein said adjustment of said angle of focus is made to said mirror assembly under control of said data processing device.

4. The method of claim 1, wherein said calculated length, width, and height are displayed on a display or on a monitor.

5. The method of claim 1, wherein said calculated length, width, and height are transmitted to a parcel processing system.

6. The method of claim 1, wherein said calculated weight is displayed on said display or on said monitor.

7. The method of claim 1, wherein said calculated weight is transmitted to said parcel processing system.

8. An apparatus for measuring the dimensions of a parcel for use in a parcel processing application of a data processing device and comprising:

(a) supporting means for supporting a parcel placed thereupon for measurement; wherein said supporting means has a plurality of raised sides wherein two of said raised sides meet at right angles for placing said parcel thereagainst as a registration point;

(b) first laser beam transmitting means for transmitting a first beam against a surface of said placed parcel and onto a first target point;

(c) second laser beam transmitting means for transmitting a second beam against said surface of said placed parcel and onto a second target point and wherein said first target point and said second target point are in a line parallel to said supporting means;

(d) rotating mirror means for focusing on said first target point and on said second target point;

(e) detecting means for detecting a change in angle between said rotating mirror means and each of said first and said second target points; and (f) data processing means for:
  (i) controlling said first and said second laser beam transmitting means;
  (ii) controlling said rotation of, and an angle of adjustment of, said rotating mirror means;
  (iii) controlling said detector means;
  (iv) receiving and essentially simultaneously processing measurement data from said detecting means;
  (v) transmitting said measurement data from said detecting means to calculator means to determine actual measurements based on a preselected measurement scale;
  (vi) receiving said actual measurements from said calculator means; and
  (vii) transmitting, said actual measurements to a display means and/or to a parcel processing application resident in said data processing device.

9. The apparatus of claim 8, wherein said supporting means is the weighing surface of a scale capable of calculating a weight of said placed parcel.

10. The apparatus of claim 8, wherein said calculated weight is converted to a signal capable of being received and processed by said data processing means.

* * * * *